(12) United States Patent
Grings et al.

(10) Patent No.: US 8,985,373 B2
(45) Date of Patent: Mar. 24, 2015

(54) PLASTIC CONTAINER WITH A BARRIER FOIL

(75) Inventors: Rüdiger Grings, Schwändi bei Schwanden (CH); Armin Gölles, Zürich (CH)

(73) Assignee: Netstal-Maschinen AG, Näfels (CH)

( * ) Notice: Subject to any disclaimer, the term of this patent is extended or adjusted under 35 U.S.C. 154(b) by 247 days.

(21) Appl. No.: 13/375,648

(22) PCT Filed: May 21, 2010

(86) PCT No.: PCT/EP2010/057056
§ 371 (c)(1),
(2), (4) Date: Dec. 1, 2011

(87) PCT Pub. No.: WO2010/139566
PCT Pub. Date: Dec. 9, 2010

(65) Prior Publication Data
US 2012/0067885 A1    Mar. 22, 2012

(30) Foreign Application Priority Data
Jun. 2, 2009  (DE) .......................... 10 2009 023 477

(51) Int. Cl.
| B65D 1/40 | (2006.01) |
| B29C 45/16 | (2006.01) |
| B29C 45/14 | (2006.01) |
| B65D 77/20 | (2006.01) |
| B29L 31/00 | (2006.01) |

(52) U.S. Cl.
CPC ....... *B29C 45/1671* (2013.01); *B29C 45/14778* (2013.01); *B29C 45/1679* (2013.01); *B65D 77/2024* (2013.01); *B29K 2995/0067* (2013.01); *B29L 2031/7132* (2013.01)

USPC .... 220/359.1; 220/62.2; 220/200; 220/359.3; 220/359.4; 206/484; 229/123.1

(58) Field of Classification Search
CPC ..................... B29C 45/1671; B29C 45/14778; B29C 15/161679; B65D 77/2024
USPC ............... 220/62.2, 200, 359.1, 359.3, 359.4; 206/484; 229/123.1
See application file for complete search history.

(56) References Cited

U.S. PATENT DOCUMENTS

| 5,178,293 A * | 1/1993 | Suzuki et al. .............. 220/359.3 |
| 6,199,713 B1 * | 3/2001 | de Vries ................... 220/495.02 |
| 2002/0008113 A1 * | 1/2002 | Fujii et al. ................. 220/592.2 |
| 2004/0226990 A1 * | 11/2004 | Williams et al. ........... 229/123.1 |

FOREIGN PATENT DOCUMENTS

| EP | 0 342 237 A1 | 1/1994 |
| EP | 0 665 171 A1 | 8/1995 |

(Continued)

*Primary Examiner* — Elizabeth Volz
(74) *Attorney, Agent, or Firm* — Henry M. Feiereisen LLC

(57) ABSTRACT

The invention relates to a method for producing a plastic container having a container wall provided with a barrier foil, comprising the following steps: forming a foil body from a barrier foil, the shape of which corresponds to at least part of the container wall of the plastic container to be produced, arranging the foil body in an injection mold, applying a first plastic layer onto a first side of the foil body that corresponds to an inner side or outer side of the plastic container, and applying a second plastic layer onto a second side of the foil body that corresponds to an outside or inside of the plastic container, and to a plastic container comprising a container wall having a barrier foil, wherein the barrier foil is arranged centrally between an inner side and an outer side of the plastic layer.

10 Claims, 4 Drawing Sheets

(56) References Cited

FOREIGN PATENT DOCUMENTS

| EP | 1 582 343 A1 | 10/2005 |
| JP | 60-071217 A | 4/1985 |
| JP | 63 045014 A | 12/1994 |
| JP | 10-156871 A | 6/1998 |

* cited by examiner

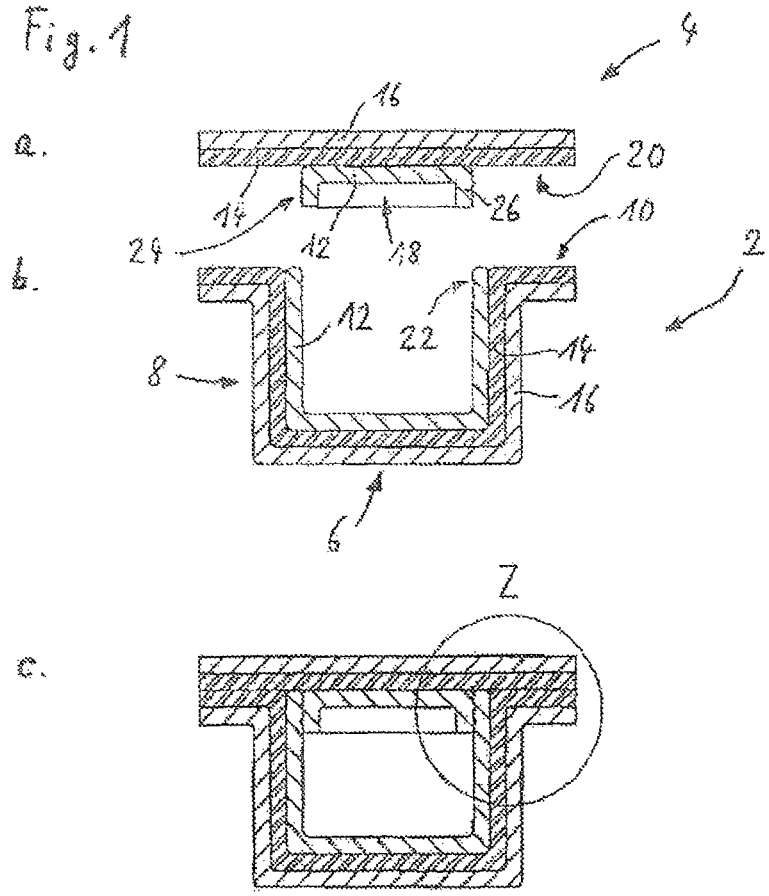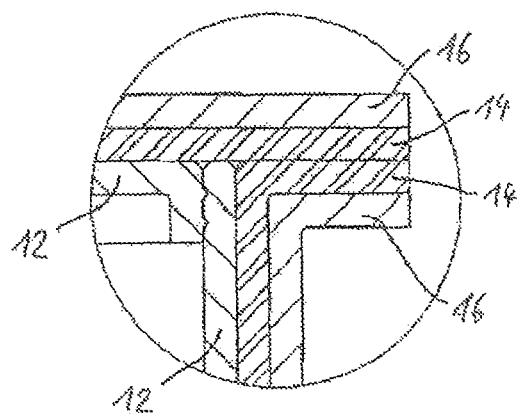

Fig. 2
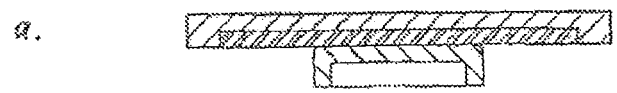
a.
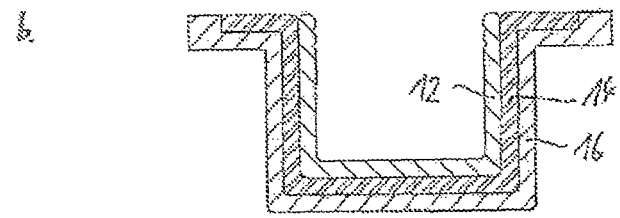
b.
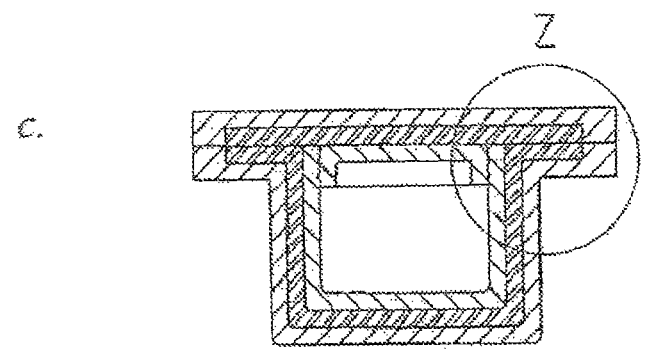
c.
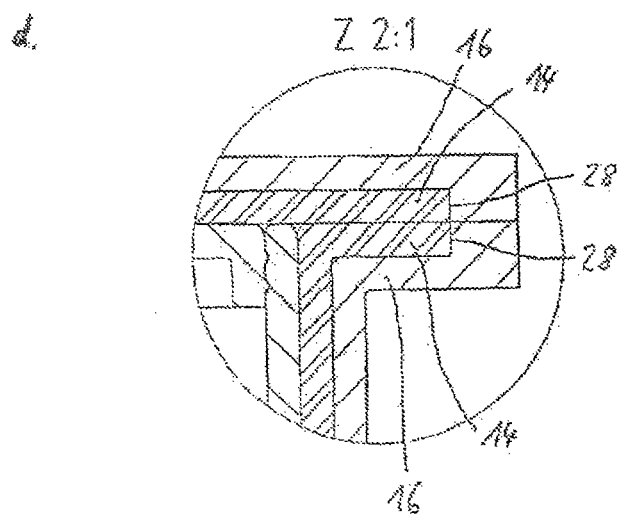
d.

Fig. 4
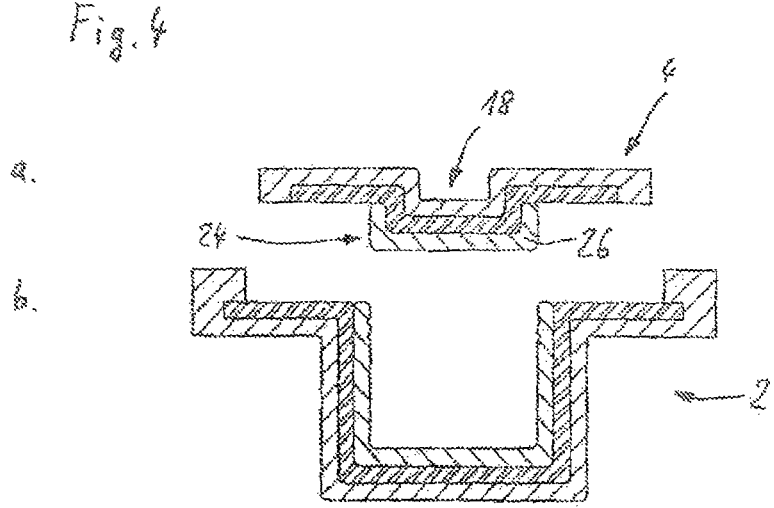
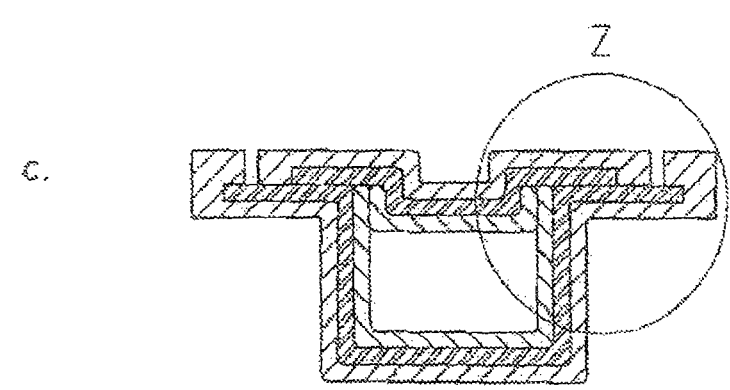
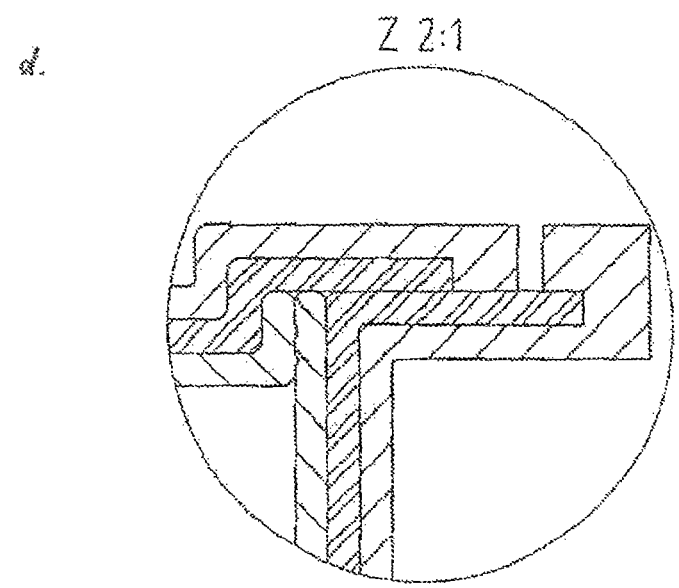

PLASTIC CONTAINER WITH A BARRIER FOIL

CROSS-REFERENCES TO RELATED APPLICATIONS

This application is the U.S. National Stage of International Application No. PCT/EP2010/057056, filed May 21, 2010, which designated the United States and has been published as International Publication No. WO 2010/139566 and which claims the priority of German Patent Application, Serial No. 10 2009 023 477.2, filed Jun. 2, 2009, pursuant to 35 U.S.C. 11(a)-(d).

BACKGROUND OF THE INVENTION

The invention relates to a method for producing a plastic container having a container wall provided with a barrier foil, and to a plastic container having a container wall provided with a barrier foil.

Such methods and plastic containers are known in various configurations, with the barrier foil located either on an inner side or on an outer side of the container. For example, JP 10156871 discloses a container provided with a so-called in-mold label in which the label and a barrier foil are located on the outer side thereof.

In particular when containers are involved having in plan view an irregular base shape or bottom area, for example when a rounded triangular base shape with unequal side lengths is involved, there is the problem that the barrier foil can hardly be applied without creases on the outer side of a plastic container, causing an aesthetic problem. A further problem is the realization of a barrier foil to completely enclose the container without any flaws, when producing a diffusion-tight container for the purpose of achieving an especially long storage capability of contents such as foodstuffs, so as to prevent, for example at areas where neighboring foil edges do not overlap, the formation of zones in which the container wall made of plastic is not covered by the barrier foil. Furthermore, when the barrier foil is applied on the outer side or inner side, there is a risk of detachment of the foil from the plastic wall in border or edge regions of the container.

SUMMARY OF THE INVENTION

It is the object of the invention to provide a method of producing a plastic container having a container wall provided with a barrier foil so as to at least substantially obviate the afore-mentioned drawbacks. Moreover, a respectively improved plastic container should be provided with a container wall provided with a barrier foil.

As far as the method is concerned, this object is solved by a method of producing a plastic container having a container wall provided with a barrier foil, including the steps: forming a foil body from a barrier foil, the shape of which corresponding to at least part of the container wall of the plastic container to be produced, arranging the foil body in an injection mold, applying a first plastic layer onto a first side of the foil body that corresponds to an inner side or outer side of the plastic container, and applying a second plastic layer onto a second side of the foil body that corresponds to an outer side or inner side of the plastic container.

The foil body may hereby be configured also as a kind of parison which has been produced in a preceding process step—for example in an injection process, deep-drawing process, or a punching process. Thus, the foil body involves a thin-walled structure having a desired barrier characteristic.

According to a preferred embodiment, a plastic layer and/or adhesive layer is applied on at least one side of the foil body or the parison for improving adhesion for example.

The foil body may be made of most different materials and also comprised of several layers to meet the desired barrier function at hand. Besides aluminum, light metal materials or other materials like EVA or EVOH may be considered.

The foil body may be provided with overlapping portions in border regions. This may be the case when the foil body has a central region, for example a bottom region, with radially projecting side tabs which are bent to form a closed side wall and have overlapping border regions.

Suitably, the plastic container is provided with a cover having a barrier foil which is coated, especially molded around, on both sides with plastic.

The foil body can be provided with a cover flange portion for formation of a cover flange.

Provision may be made to apply a plastic layer only on the outer side of the cover flange portion of the barrier foil, while the plastic layer on the inner side is omitted in the region of the cover flange portion in order to advantageously be able to directly connect the cover with the barrier foil in the area of the cover flange.

In like manner, the cover may be coated or molded around with plastic only on the outer side in a border region corresponding to the cover flange of the plastic container so that the barrier foil is exposed on the inner side in this border region and can be connected directly with the barrier foil of the plastic container in the area of its cover flange.

Provision may be made to seal the barrier foil of the cover in the region of the cover flange to the barrier foil of the plastic container.

Furthermore, the cover flange portion of the barrier foil may be molded on all sides with plastic in an outer border region to prevent the barrier foil to possibly detach from the neighboring plastic layer. There is also the possibility to coat or mold around the barrier foil on all sides with plastic in an outer border region of the cover to prevent detachment.

In order to optically match the packaging and the cover to a product, conventional technologies are conceivable for decoration or imprinting (pad printing or screen printing, labels, transfer images, hot stamping foils, hot stamping transfer). The application of the known in-mold labeling process is also conceivable, i.e. the placement of pre-printed foils prior to the injection molding process. For example, decorative foils may undergo back injection molding from outside. Also possible is a molding around on the outer side or inner side with a transparent plastic.

The object of the invention is further solved by a plastic container having a container wall with a barrier foil, with the plastic container being characterized in that the barrier foil is arranged in the container wall and molded around on the inside with a first plastic layer and on the outside with a second plastic layer.

The plastic container is preferably provided with a cover flange, with the barrier foil laid bare in at least in some areas on the inner side.

The plastic container can be connected with a cover having a barrier foil coated, especially molded around, with plastic on both sides, with a flange portion of the cover being coated or molded around with plastic only on the outer side.

In both aspects of the invention, the barrier foil can have at least a barrier layer with a thickness between 1 and 15μ, in particular between 5 and 10μ. The at least one barrier foil may be made of aluminum. Suitably, the barrier foil is provided on at least one side with a plastic layer or adhesive layer at a thickness between 1 and 15μ, in particular between 5 and 10μ.

The first and/or the second plastic layer has preferably a thickness between 0.1 and 2 mm

BRIEF DESCRIPTION OF THE DRAWING

The invention will now be described with reference to exemplary embodiments, wherein FIGS. 1a, b respectively show a schematic cross sectional view of a plastic container and a cover in accordance with the invention, FIG. 1c shows plastic container and cover according to FIGS. 1a, b in assembled state, FIG. 1d shows a detail of FIG. 1c on an enlarged scale, FIGS. 2a-d show corresponding views as FIGS. 1a-d for a second embodiment, FIGS. 4a-d show corresponding views as FIGS. 1a-d for a fourth embodiment.

DETAILED DESCRIPTION OF PREFERRED EMBODIMENTS

Figure 3:
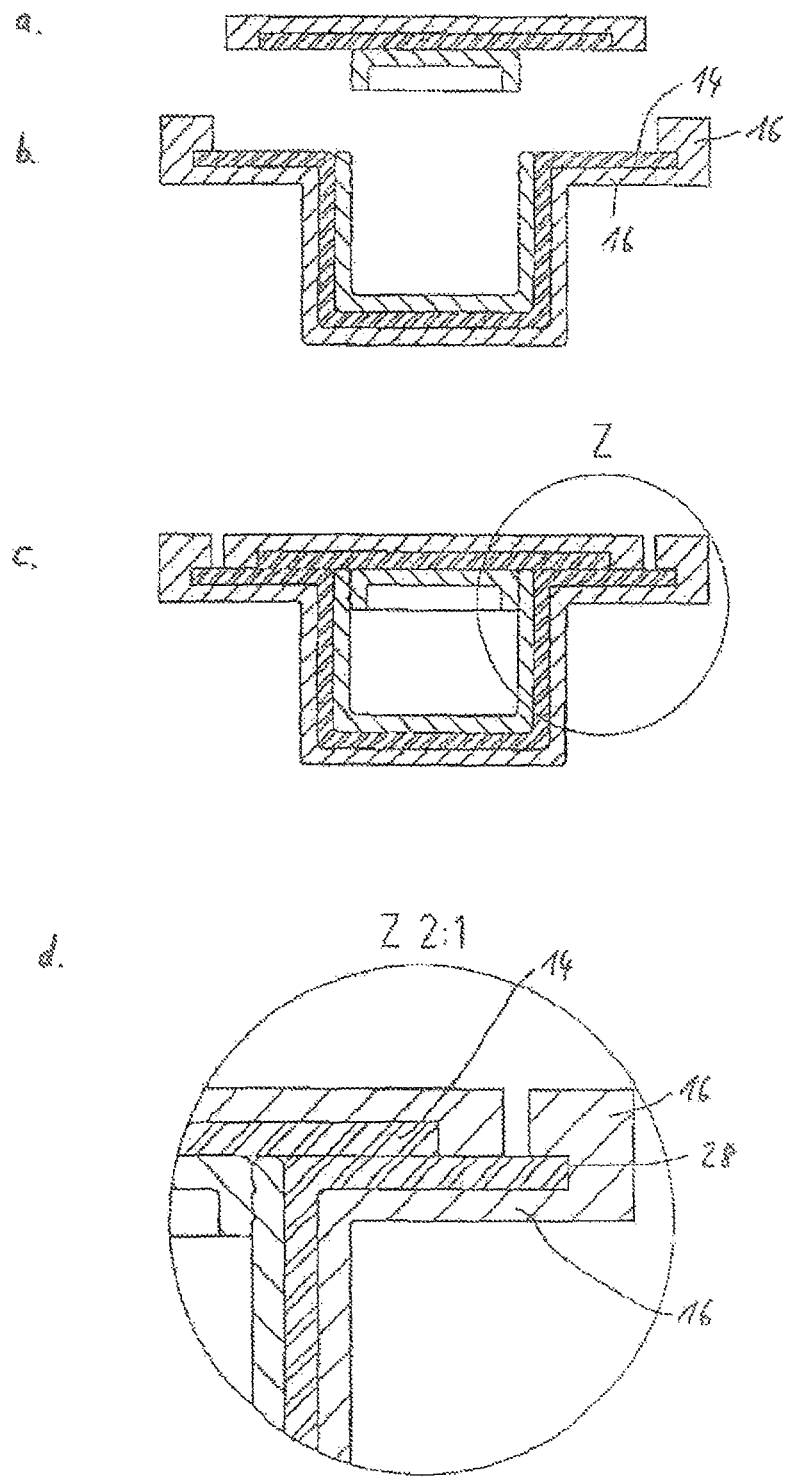
FIGS. 3a-d show corresponding views as FIGS. 1a-d for a third embodiment.

FIGS. 1a-d explain a first embodiment of the invention with reference to a plastic container with cover by way of a schematic illustration, with the thickness of the container wall being shown exaggerated in relation to its width dimensions and height dimensions.

The plastic container 2 in accordance with the invention with cover 4 is shown in cross section with exaggerated wall thickness so that the structure of container wall and cover wall can be depicted. The plastic container 2 has a bottom wall 6 and a side wall 8 from which a cover flange 10 projects out. The cover flange 10 extends along the entire circumference of the side wall 8.

Bottom and side walls 6, 8 are comprised from inside to outside substantially of three layers, namely a first inner plastic layer 12, a central barrier foil 14, and a second outer plastic layer 16.

The first plastic layer 12 is applied by injection molding onto the barrier foil 14 and has a thickness in the range between 0.1 and 2 mm. The second plastic layer 16 is also applied by injection molding onto the barrier foil 14 and has a thickness in a same range as the first plastic layer.

The barrier foil 14 has at least a barrier layer, for example an aluminum layer with a thickness between approximately 1μ and 20μ, in particular 5 to 10μ, on which a plastic layer or an adhesive layer may be disposed on one or both sides to ensure a good bond with the first and second plastic layers 12, 16 and may have a thickness in a range from 1μ and 20μ, in particular 5 to 10μ.

The barrier foil 14 is provided in the area of the cover flange 10 only with the second outer plastic layer 16 and is exposed upwards so as to be able to establish a diffusion-tight connection with the cover 4. The cover 4 has a central region 18 and a flange portion 20 in all-round surrounding relationship. Like the container body 2, the cover 4 is comprised in the central region 18 of a first outer plastic layer 12, a central barrier foil 14, and a second outer plastic layer 16. Both plastic layers are applied onto the barrier foil 14 preferably through injection molding.

The barrier foil 14 is provided in the flange portion 20 of the cover with the second outer plastic layer 16 only, while the first inner plastic layer 12 is omitted so that the barrier foil 14 is laid bare.

As shown in FIG. 1c, the barrier foils 14 of cover 4 and container body 2 bear directly upon one another in the respective flange portions 10, 20, after the cover 4 has been placed onto the container body 2, and can be sealed with one another by means of the plastic or adhesive layers with which the respective barrier layer of the barrier foils are optionally provided.

After sealing of cover and container body, the interior of the plastic container is closed in a diffusion-tight manner against the surroundings so that especially an oxygen exchange or water vapor exchange with the surroundings cannot occur and an especially long durability of foodstuff contained in the container can be realized.

FIG. 1d shows on an enlarged scale the conditions in proximity of the flange portions 10, 20. The first inner plastic layer 12 of the container body 2 has in its upper region adjacent to the cover flange 10 first locking means 22 which interact formfittingly with second locking means 24 configured at a projecting portion 26 of the first inner plastic layer 12 and implement a locking and retention of the cover in the attached state. The locking means can be formed by indentations and corresponding projections. This allows a locking function when the cover is re-attached after opening has occurred.

The barrier foils 14 rest directly upon one another in the flange portions 10, 20, i.e. with their plastic and/or adhesive layers, if present, and are sealed directly upon one another.

FIG. 2 shows a variant in which the second outer plastic layers 16 of cover and container body, respectively, span over an outer end face or cutting or stamping area 28 of the barrier foil 14. This solution ensures that the barrier foil 14 cannot easily detach from the outer plastic layer 16 of the cover or the container body, when the cover is opened for the first time.

FIG. 3 describes a variant in which the second outer plastic layer 16 spans not only an outer end face 28 of the barrier foil 14 but in addition an adjacent border region of the inner surface of the barrier foil 14 so as to establish an even better assurance against detachment of the barrier foil 14 from the outer plastic layer 16 in the area of the cover flange of the container.

The embodiment of FIG. 4 corresponds to the one according to FIG. 3 with the difference residing in that the central region 18 of the cover 4 is shaped inwardly in direction of the bottom wall 6 of the container body 2 and tracks the shape of the projecting region 26 which carries the second locking means 24.

A method of producing such a plastic container in accordance with the present invention is characterized by the formation of a foil body from a barrier foil with a shape corresponding to at least part of the container wall of the plastic container to be produced. A flat foil blank can be used for this purpose which can have a region corresponding to the bottom wall 6 of the container body 2 and tab-like regions projecting therefrom in correspondence to the side wall and the cover flange and formed by bending and connecting with the region forming the bottom into a spatial foil body. Suitably, overlapping zones are hereby formed where the adjacent foil regions are tightly sealed with one another.

The foil blank may hereby be placed in flat or slightly deformed shape into an injection mold and shaped to a foil body by closing the mold, with the tab zones of the foil body either directly adjoining one another or having areas in overlapping relationship. The overlapping zones can be sealed in the injection mold by plastic injected under high pressure, or the overlapping zone can be sealed with one another before injecting the plastic.

The thus-formed diffusion-tight foil body or the respectively deformed blank has a first side on which a first plastic layer is applied in an injection mold and which can correspond to an inner side or outer side of the container. There-after, a second plastic layer is applied in the same or a second injection mold onto an opposite second side of the foil body (outer side or inner side of the container), whereby the cover flange portion is suitably not covered by the inner plastic layer, as described above.

The cover 4 can be produced in corresponding manner by applying a plastic layer first on one side and then on the opposite side of the barrier foil. As the cover can be completely flat, there is also the possibility to connect a barrier foil portion on both sides with prefabricated plastic layers or to coat a barrier foil with plastic in a different manner on both sides.

The invention claimed is:

1. A plastic container, comprising a container body having a container wall, said container wall including
    a foil body made of a barrier foil in a form of a thin-walled structure with desired barrier characteristic,
    a first plastic layer injection-molded to an inner side of the barrier foil,
    a second plastic layer injection-molded to an outer side of the barrier foil, and
    a cover for connection to the container body, said cover has a barrier foil which is coated or molded around on both sides with plastic, said cover having a flange portion which corresponds to a cover flange of the container body, said flange portion being molded around with plastic only on an outer side thereof.

2. The plastic container of claim 1, wherein the barrier foil of the cover is sealed in a region of the cover flange and the flange portion directly adjacent to the barrier foil of the container body to seal an interior of the container in a diffusion-tight manner against the surroundings.

3. The plastic container of claim 1, wherein at least one of the first and second plastic layers has a thickness between 0.1 and 2 mm.

4. The plastic container of claim 1, wherein the foil body has portions in overlapping relation in border regions.

5. The plastic container of claim 1, wherein the barrier foil has at least one barrier layer with a thickness between 1 and 15 μ.

6. The plastic container of claim 5, wherein the thickness ranges between 5 and 10 μ.

7. The plastic container of claim 5, wherein the at least one barrier layer is made from aluminum.

8. The plastic container of claim 5, wherein the barrier foil has on at least one side a plastic layer or adhesive layer with a thickness between 1 and 15 μ.

9. The plastic container of claim 8, wherein the thickness ranges between 5 and 10 μ.

10. A plastic container comprising a container body having a container wall, said container wall including
    a foil body made of a barrier foil in a form of a thin-walled structure with desired barrier characteristic,
    a first plastic layer injection-molded to an inner side of the barrier foil,
    a second plastic layer injection-molded to an outer side of the barrier foil, and
    a cover flange extending from the container wall, with the barrier foil being laid bare on an inner side at least in some areas thereof.

* * * * *